(12) United States Patent
Lehnhardt (10) Patent No.: US 6,758,500 B2
(45) Date of Patent: Jul. 6, 2004

(54) FLARED ENDS CONDUIT COUPLING

(75) Inventor: Gary D. Lehnhardt, Cedar Grove, WI (US)

(73) Assignee: Construction Forms, Inc., Port Washington, WI (US)

( * ) Notice: Subject to any disclaimer, the term of this patent is extended or adjusted under 35 U.S.C. 154(b) by 0 days.

(21) Appl. No.: 10/355,644

(22) Filed: Jan. 31, 2003

(65) Prior Publication Data

US 2003/0197381 A1 Oct. 23, 2003

Related U.S. Application Data

(60) Provisional application No. 60/374,052, filed on Apr. 19, 2002.

(51) Int. Cl.$^7$ ................................. F16L 23/00
(52) U.S. Cl. ................ 285/365; 285/406; 285/409; 285/111
(58) Field of Search ................ 285/364, 365, 285/366, 367, 406, 407, 408, 409, 111

(56) References Cited

U.S. PATENT DOCUMENTS

| | | | | |
|---|---|---|---|---|
| 1,043,412 A | * | 11/1912 | Faunce | 285/407 |
| 2,793,883 A | * | 5/1957 | Main, Jr. | 285/364 |
| 3,235,293 A | * | 2/1966 | Condon | 285/367 |
| 3,284,106 A | | 11/1966 | McIntosh et al. | |
| 3,432,189 A | * | 3/1969 | Buller | 285/366 |
| 3,498,649 A | * | 3/1970 | Pfeuffer | 285/365 |
| 3,705,737 A | | 12/1972 | Westerlund et al. | |
| 3,832,097 A | | 8/1974 | Schlect | |
| 3,851,902 A | * | 12/1974 | Robinson | 285/367 |
| 3,967,837 A | | 7/1976 | Westerlund et al. | |
| 4,305,607 A | | 12/1981 | Westerlund et al. | |
| 4,311,248 A | | 1/1982 | Westerlund et al. | |
| 5,863,078 A | * | 1/1999 | Ball | 285/367 |

FOREIGN PATENT DOCUMENTS

| | | | |
|---|---|---|---|
| AU | 8348482 A | 11/1982 | |
| DE | 4211850 A | 2/1993 | |
| EP | 0469687 A | 2/1992 | |
| GB | 2121135 | * 12/1983 | ............ 285/365 |
| GB | 2214523 A | 9/1989 | |

* cited by examiner

Primary Examiner—David Bochna
(74) Attorney, Agent, or Firm—Andrus, Sceales, Starke & Sawall, LLP (57) ABSTRACT

A coupling arrangement for permitting fluid-tight, pressurized fluid flow therethrough includes a pair of conduit members located in end-to-end alignment, each of the conduit members having a flared end. An encircling coupling unit surrounds the ends of the conduit members and has structure to tighten the coupling unit around the flared ends of the conduit members, the coupling unit having inner lateral surfaces partially defining a coupling cavity. An encircling, deformable gasket is disposed in the cavity of the coupling unit. The gasket has exterior lateral surfaces spaced from the inner lateral surfaces of the coupling unit, and interior surfaces defining an annular recess therein. A rigid ring liner is retained within the annular recess of the deformable gasket to reinforce the gasket. The flared ends of the conduit members are engaged in wedging and sealing relationship between the inner lateral surfaces of the coupling unit and the exterior lateral surfaces of the deformable gasket.

19 Claims, 8 Drawing Sheets

FLARED ENDS CONDUIT COUPLING

CROSS REFERENCE TO RELATED APPLICATION

This application is based on and claims priority from U.S. Provisional Patent Application Serial No. 60/374,052 filed Apr. 19, 2002.

FIELD OF THE INVENTION

The present invention relates broadly to coupling assemblies for releasably joining conduit sections, such as pipes and hoses in axial, end-to-end relationship. More particularly, the invention pertains to a safer and better sealed coupling assembly for breakably connecting opposed end structures of the conduit sections such as used in concrete pumping systems.

BACKGROUND OF THE INVENTION

Concrete pumping systems are used in placement of concrete in various applications. The present invention has been particularly applied to the concrete pumping technology but may of course be used in other conduit lines which transport like highly mechanically abrasive and wear creating fluid materials under typical pressures of 500 to thousands of pounds of pressure per square inch (psi). In boom mounted units, the booms are formed of tubes to form a part of the pumping line. Hereinafter, conduit is generically used to include any tubular member, such as a pipe or hose, which is interconnected to form a part of the line. In concrete pumping, excessive wear of the conduit is a common problem, and a special problem at the coupling of the conduit sections, particularly where there is a change of flow direction.

In concrete pumping systems, conduit sections are interconnected to each other with releasable couplings. A typical system is disclosed in U.S. Pat. No. 3,705,737, which issued Dec. 1, 1972 and U.S. Pat. No. 4,305,607 which issued Dec. 15, 1981, to the assignee of this invention. The coupling of the conduits in present technology generally include a multiple part, releasable clamp assembly, such as a hinged C-shaped clamp unit with a sealing gasket located within the coupling to seal the joint between slightly spaced conduit ends of the line. Thus, the conduit ends will normally be spaced slightly from each other and sealed by special surrounding gasket structures. The conduit ends universally include an end body member which has an annular groove, with the side edges of the U-shaped clamp members fitting within the grooves and locking the conduits to each other.

Unfortunately, it has been found that because of the shallow depth of the annular grooves in the conduit ends, the engagement surface areas of the side edges of the coupling clamp members with the grooves, and the working pressure of the pressurized fluid flowing through the conduit lines, there is a greater possibility of bursting at the conduit end than desired. In addition, it has also been discovered that the gasket design of the prior art coupling can restrict the working pressure in the conduit line and lead to premature leaking.

Accordingly, it is desirable to provide an improved conduit end structure which cooperates with the coupling and gasket to avoid the drawbacks of the prior art.

SUMMARY OF THE INVENTION

It is a general object of the present invention to provide an enhanced conduit coupling arrangement for concrete pumping systems which reduces the possibility of bursting and leaking during high pressure operation.

It is one object of the present invention to provide a conduit end interposed between a coupling and a gasket within the coupling in a wedge and seal relationship.

It is another object of the present invention to provide a conduit end having a flared construction.

It is also an object of the present invention to provide a coupling having a gasket which allows for a higher working pressure when placed within a conduit line.

It is a further object of the present invention to provide a unique method of assembling a coupling arrangement.

In one aspect of the invention, a coupling arrangement is provided for permitting fluid-tight, pressurized fluid flow therethrough. A pair of conduit members is located in end-to-end relationship, each of the conduit members having a flared end. An encircling coupling unit surrounds the ends of the coupling of the conduit members and has structure to tighten the coupling unit around the flared ends of the conduit members. The coupling unit has inner lateral surfaces partially defining a coupling cavity. An encircling, deformable gasket is disposed in the cavity of the coupling unit. The gasket has exterior lateral surfaces spaced from the inner lateral surfaces of the coupling unit and interior surfaces defining an annular recess therein. A rigid ring liner is retained within the annular recess of the deformable gasket to reinforce the gasket. The flared ends of the conduit members are engaged in wedging and sealing relationship between the inner lateral surfaces of the coupling unit and the exterior lateral surfaces of the deformable gasket.

In a preferred embodiment, at least one of the conduit members includes a hose and at least one of the other conduit members includes a pipe. The flared ends are bent generally at an angle of between 90 degrees and 109 degrees relative to a longitudinal axis of the coupling unit. The flared ends include axially extending sections to which the hose and pipe are secured. The coupling unit is formed by a pair of coupling sections pivotally connected together. Each coupling section includes a set of axially extending outer faces connected to a set of radially extending stepped portions, in turn, connected to a set of axially extending stepped portions. Each coupling section includes a base defining an inner diameter of the coupling section, the base having a pair of opposed ends. Each coupling section includes a set of inclined side walls connecting one end of the base with the axially extending stepped portions. The inclined side walls diverge from the base to the axially extending stepped portions. The inclined side walls define the inner lateral surfaces of the coupling unit. The inclined side walls and the base define a generally frustroconically-shaped coupling cavity for receiving the flared ends of the conduit members and the gasket therein. The deformable gasket is a resilient, rubber-like ring member centrally positioned in the coupling cavity. The gasket includes an outer end wall defining an outer diameter of the gasket, the outer end wall being engageable with the base of each coupling section. The gasket further includes a set of vertical sidewalls connected to the outer end wall by a set of angular shoulders. The set of vertical sidewalls and the set of angular shoulders define the exterior lateral surfaces of the gasket. The gasket further includes a set of inner faces extending radially from the set of vertical sidewalls. The gasket is formed with an annular recess for receiving and maintaining the ring liner therein. The inner faces define an inner diameter of the gasket when the ring liner is retained in the annular recess. The annular shoulders and vertical sidewalls are spaced inwardly from the inclined side walls of each coupling section. The inclined side walls of the coupling sections are formed at an angle of about 19 degrees relative to the axially extending step portions. The angular shoulders of the gasket are oriented at an angle of about 26 degrees relative to the vertical sidewalls of the gasket.

In another aspect of the invention, a coupling arrangement for permitting fluid-tight, pressurized fluid flow therethrough includes a pair of conduit members located in end-to-end relationship. An encircling coupling unit surrounds the ends of the conduit members in a tightened closure thereon and has inner lateral surfaces partially defining a cavity. A resilient gasket is disposed in the cavity and has exterior lateral surfaces thereon. The invention is improved wherein the conduit members have flared ends engaged in wedging and sealing relationship between the inner lateral surfaces of the coupling unit and the exterior lateral surfaces of the gasket whereby an increase in the pressure of fluid flow through the conduit members will increase the degree of wedging and sealing relationship of the flared ends between the coupling unit and the gasket.

In yet another aspect of the invention, there is contemplated a method for assembling a coupling arrangement including the steps of:

a) providing a pair of conduit members in end-to-end relationship, each of the conduit members having a flared end;

b) supplying an encircling coupling unit having inner lateral surfaces partially defining a cavity in the coupling unit;

c) placing the flared ends of the conduit members inside the coupling unit adjacent the inner lateral surfaces thereof;

d) providing a deformable gasket having exterior lateral surfaces and an annular surface for retaining a ring liner therein; and e) positioning the deformable gasket and ring liner in the cavity of the coupling unit between the flared ends such that the flared ends of the conduit members are in wedging and sealing relationship between the inner lateral surfaces of the coupling unit and the exterior lateral surfaces of the deformable gasket.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
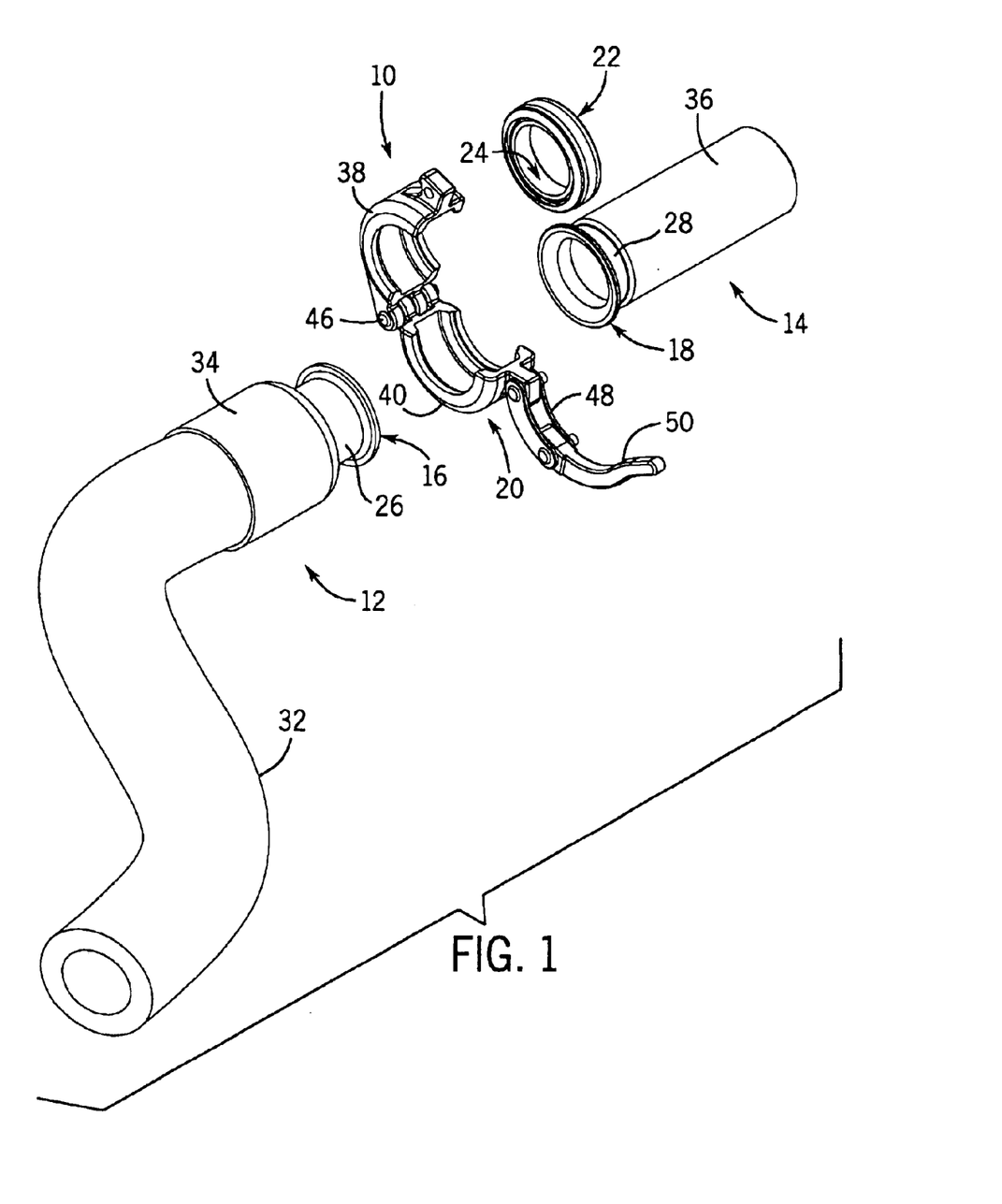
FIG. 1 is an exploded, perspective view of a flared end conduit coupling arrangement in accordance with the invention.

Referring now to the drawings and particularly FIG. 1, thereshown is an unassembled coupling arrangement 10 comprised of a pair of conduit members 12, 14 having flared ends 16, 18, a coupling unit 20, and a deformable gasket 22 having a ring liner 24 retained therein.

Figure 2:
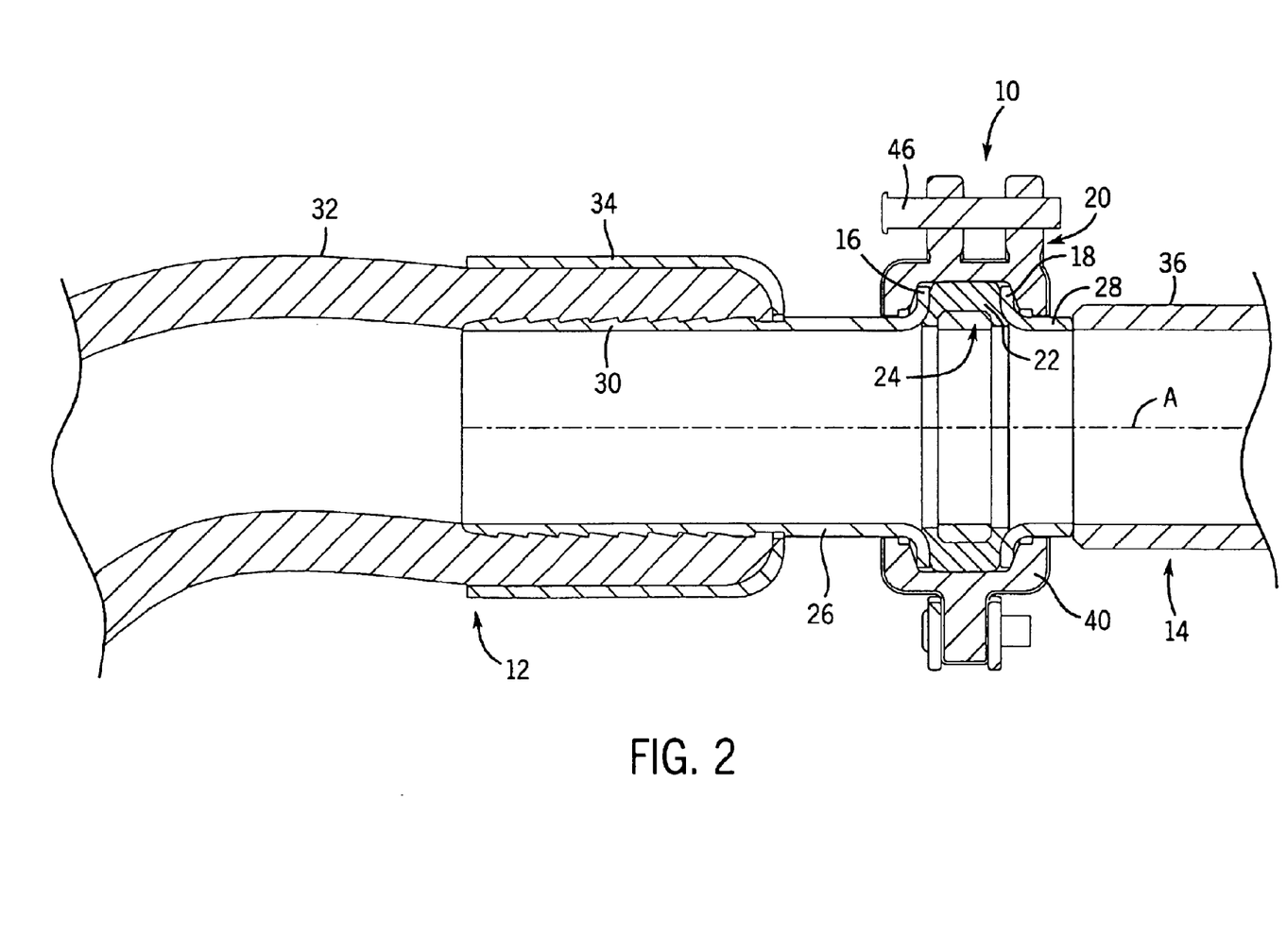
FIG. 2 is a cross sectional view of the assembled flared end conduit coupling arrangement.
Figure 3:
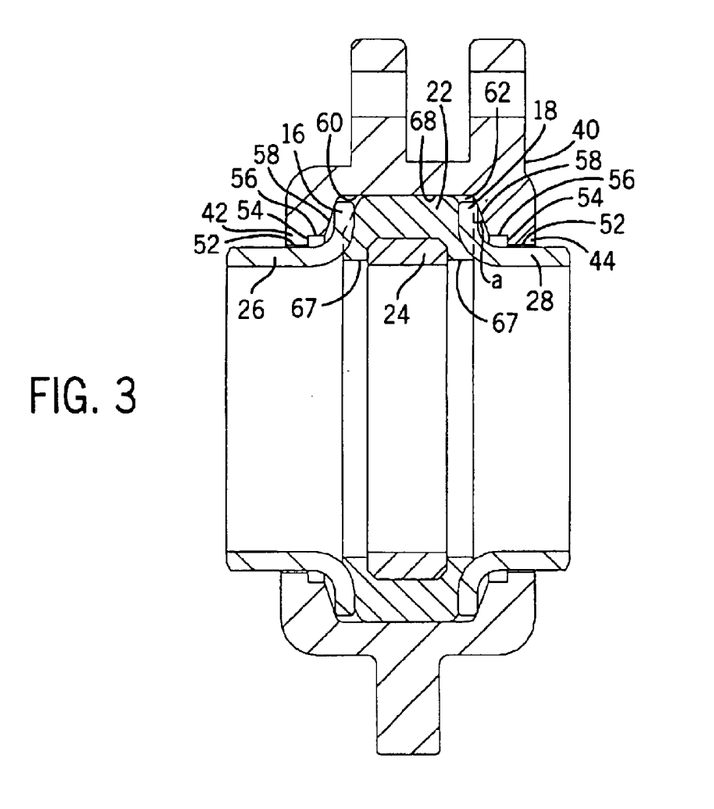
FIG. 3 is an enlarged, cross-sectional view of a portion of the coupling arrangement shown in FIG. 2.

As seen in FIG. 2, the conduit members 12, 14 have respective rigid, axially extending sections 26, 28 of similar inner diameters to which the flared ends 16, 18 are integrally formed. In the exemplary embodiment shown, the section 26 of conduit member 12 includes a barbed portion 30 upon which a flexible hose 32 is frictionally received and further secured by a ferrule 34 which is crimped thereon. The section 28 of coupling member 14 includes a rigid pipe 36 which is attached thereto, such as by welding. Preferably, as shown in FIGS. 2 and 3, the flared end 16, 18 are bent generally at 90 degree angles relative to the longitudinal axis A of the aligned conduit members 12, 14. However, as will be described later, the flared ends 26, 28 may also be bent within a preferred range of obtuse angles from 91 degrees to 109 degrees.

The coupling unit 20 is employed to releasably interconnect the conduit members 12, 14 in flared end-to-flared end relationship to establish a continuous flow path of pressurized fluid, such as concrete, therebetween. Coupling unit 20 includes a pair of similar semi-circular sections 38, 40, (FIGS. 5 and 6) the opposite faces of which are generally radially planar surfaces such that with the coupling unit 20 in a closed position shown in FIGS. 2 and 3, an essentially complete circular end closure is provided about the adjacent conduit members 12, 14. The coupling sections 38, 40 (FIGS. 5 and 6) are formed with similar cross sections and are generically of U-shaped cross construction defining a pair of laterally spaced legs 42, 44. The coupling sections 38, 40 are interconnected at one end by a hinge pin 46 (FIG. 2) and at an opposite end by a pivotal connection 48 (FIG. 5) having a manually operable handle 50 which permits the release and opening of the coupling unit 20 with respect to the conduit members 12, 14 for assembling and disassembling, in this case, of the hose and pipe members.

As seen best in FIG. 3, each coupling section 38, 40 has axially extending outer faces 52, radially extending stepped portions 54, axially extending stepped portions 56 and inclined sidewalls 58 which merge into a base 60 forming the inner diameter of the sections 38, 40. The inclined sidewalls 58 diverge from the base 60 to the axially extending stepped portions 56. The inclined sidewalls 58 serve as inner lateral surfaces and together with the base 60 define a generally frustroconically-shaped coupling cavity 62. The cavity 62 has a size, as will be appreciated hereafter, which will accommodate both the gasket 22 and flared ends 16, 18 in a physically, firm connection and fluid-tight relationship.

Figure 4:
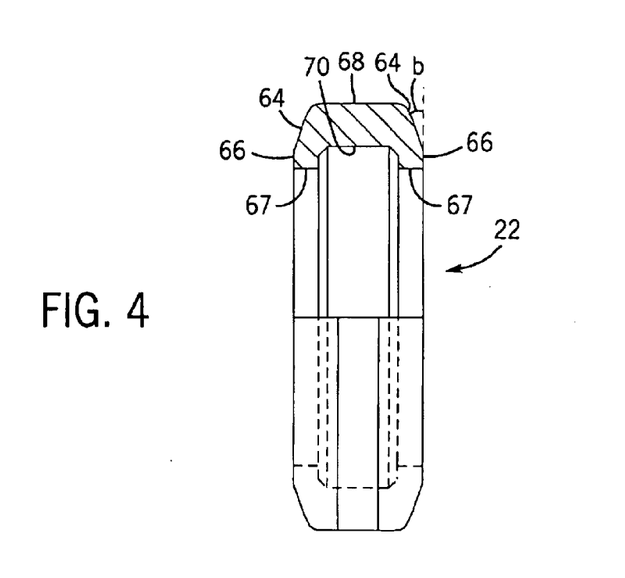
FIG. 4 is an enlarged view of the undeformed gasket, in partial cross section, prior to assembly in the coupling arrangement.

The deformable gasket 22 is a resilient, rubber-like, ring shaped member which is designed to be centrally positioned within the coupling cavity 62. The undeformed gasket 22 shown in FIG. 4 is provided with exterior lateral surfaces defined by angular shoulders 64 which connect on one end with vertical sidewalls 66. The inner diameter of the gasket 22 with ring 24 in place is formed by inner faces 67. The angular shoulders 64 connect on the other end with an outer end wall 68. As further seen in the dotted lines in FIG. 3, which represent the undeformed size of the gasket 22, the angular shoulders 64 and vertical sidewall 66 are configured to be spaced inwardly from the inclined sidewalls 58 of the coupling unit 20. The outer end wall 68 of the gasket 22 is engageable against the base 60 of the coupling unit 20. The internal portion of gasket 22 is formed with an annular recess 70 (FIG. 4) for receiving and maintaining therein the rigid ring liner 24 preferably made of steel, which serves to prevent the gasket 22 from collapsing and adds durability to the system. In addition, the ring liner 24 protects the gasket 22 from the abrasive wear and high pressure of the concrete flowing through the conduit line.

Figure 5:
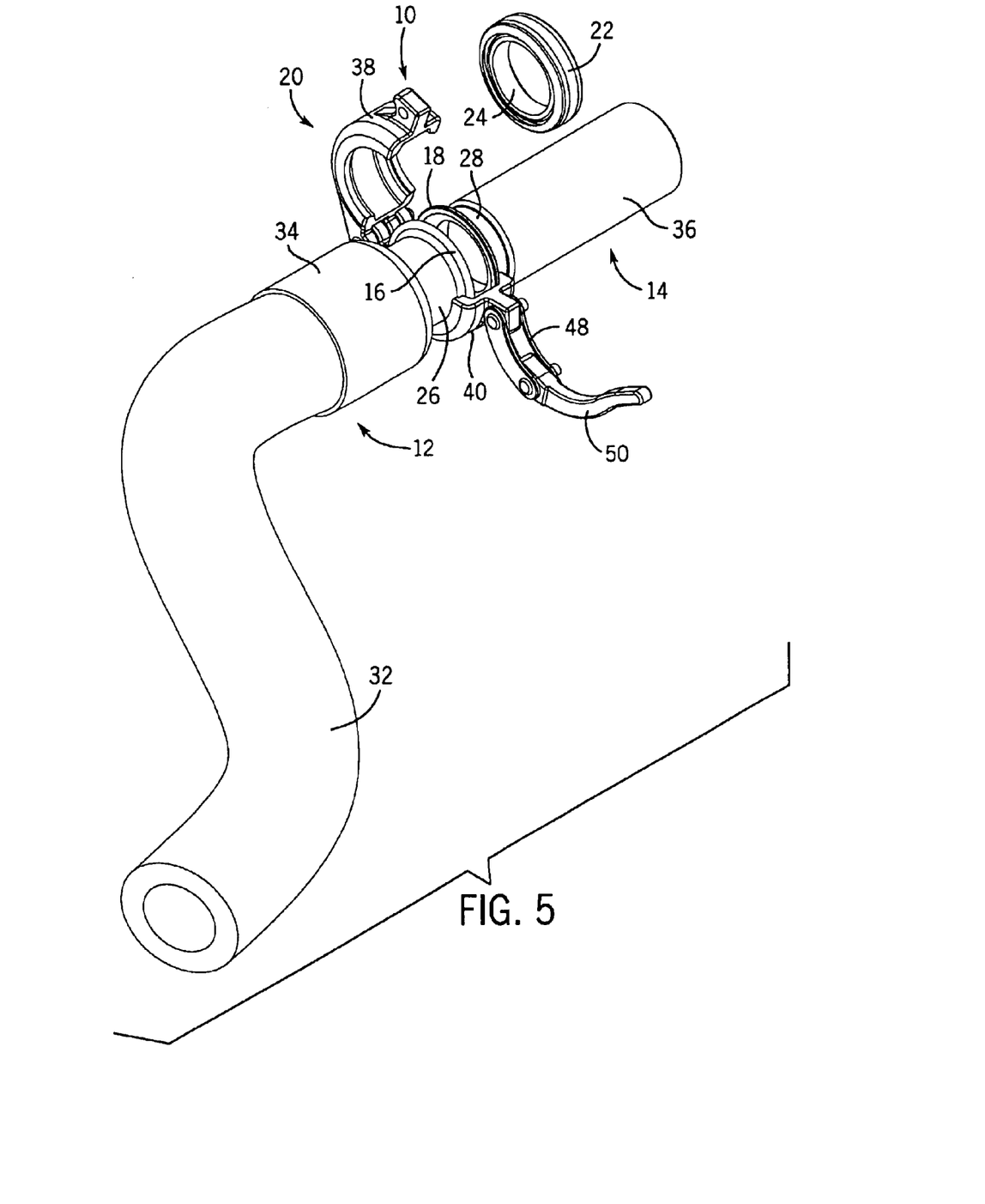
FIGS. 5 through 8 are perspective views showing the progressive assembly of the coupling arrangement.
Figure 6:
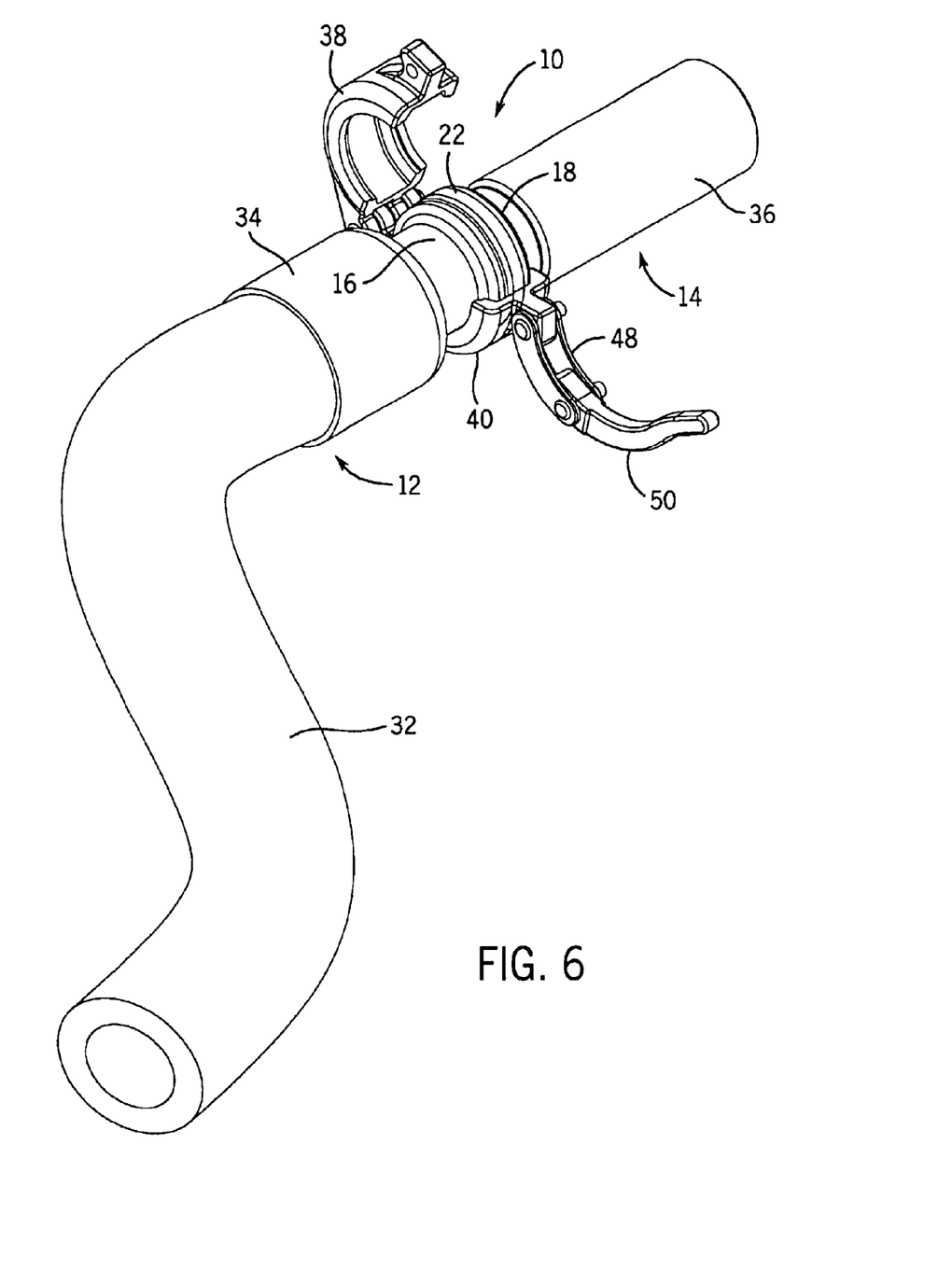
Figure 7:
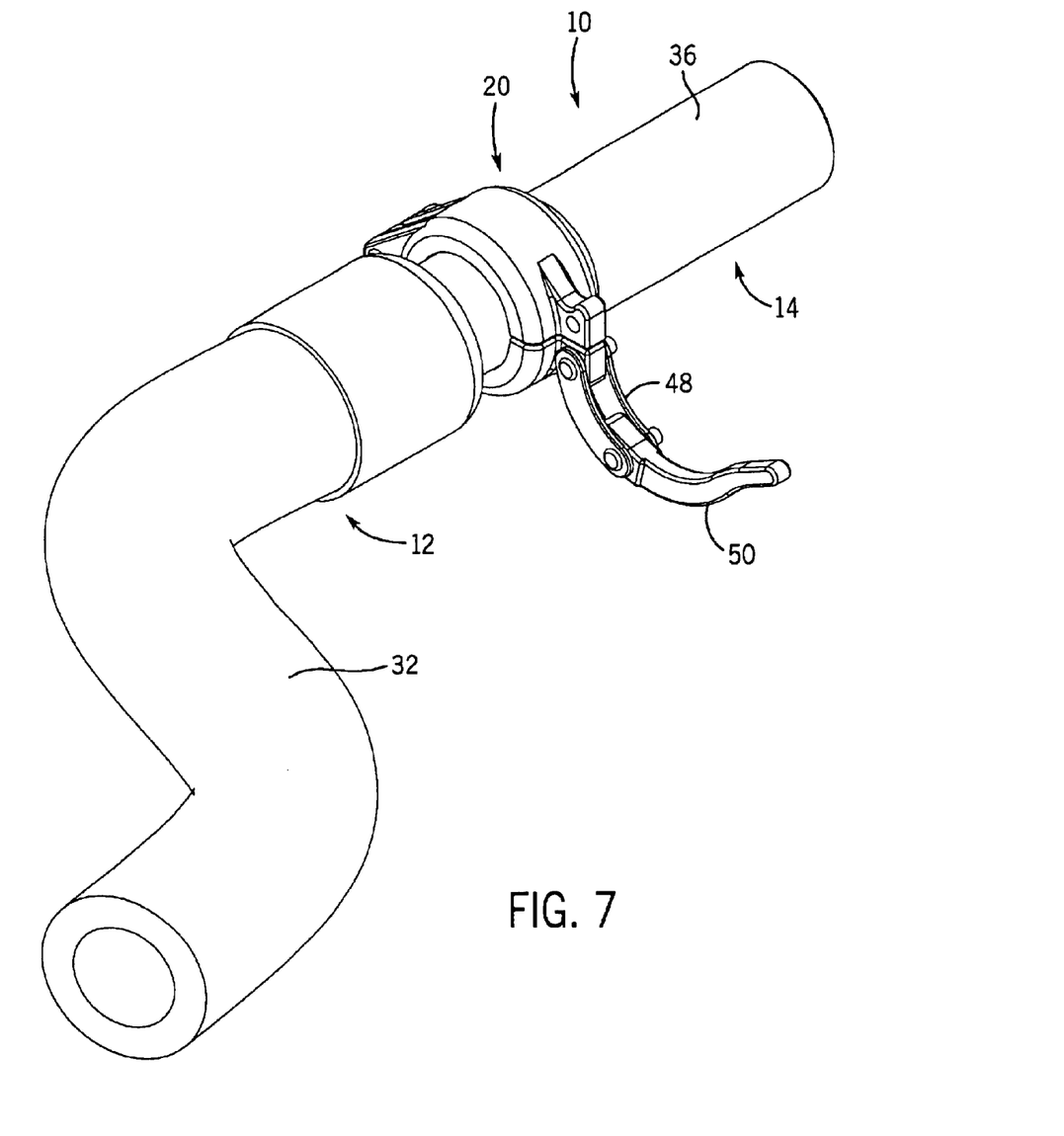
Figure 8:
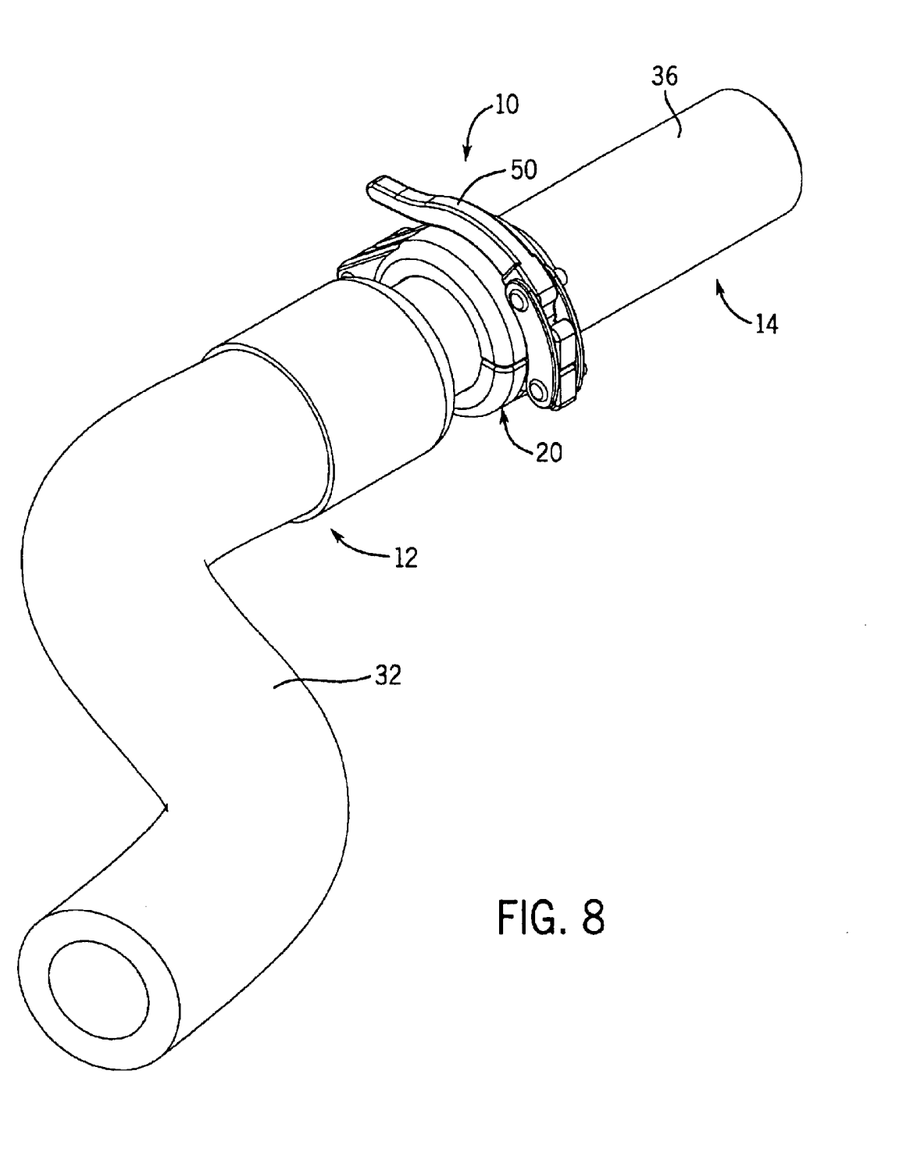

Referring back to FIG. 1, to assemble the coupling arrangement 10, the coupling unit 20 is pivotally opened on a flat surface so that the coupling sections 38, 40 are separated from one another. It is important that the internal surfaces of the coupling sections, 38, 40 are in good structural condition and are free of any foreign material, such as concrete which may have accumulated in prior use of the coupling unit 20. Then, as shown in FIG. 5, the flared ends 16, 18 are placed in the coupling section 40 so that the flared ends 16, 18 are aligned and located against the inclined sidewalls 58 thereof. Next, as depicted in FIG. 6, the gasket 22 in its undeformed condition with ring liner 24 installed and retained within annular recess 70, is squeezed into a gap between the aligned flared ends 16, 18 so that the exterior lateral surfaces of the gasket 22 will begin to deform. The coupling section 38 is then pivoted and closed against complimentary coupling section 40 (FIG. 7), and the handle 50 is snapped shut (FIG. 8) to complete the assembly.

In the closed position, the gasket 22 is further pre-stressed at about 500 psi with the exterior lateral surfaces assuming the deformed curved solid line contours shown in FIG. 3 as the flared ends 16, 18 are wedged and sealed between the inner surfaces of coupling section 40 and the outer sides of the gasket 22. More particularly, the inner tips of the flared ends 16, 18 engage against the top portion of the inclined sidewalls 58 of coupling section 40, while the outer curved or radiused portions of the flared ends 16, 18 force the angular shoulders 64 and vertical sidewalls 66 of gasket 22 inwardly. With concrete flowing through the coupled conduits 12, 14, internal pressure can rise to about 1650 psi which acts on the inner surfaces 67 of the gasket 22 to greatly enhance the wedging and sealing relationship initially formed among the flared ends 16, 18, the gasket 22 and the coupling section 40.

Such wedging and sealing relationship provided in the coupling arrangement of the present invention has proven to be more desirable than the prior art coupling which relied upon the legs of a coupling unit being clamped in square grooves of the conduit members 12, 14. That is, the present invention enables increased coupling engagement of the flared end 16, 18, permits easier assembly of the coupling arrangement 10, and reduces bursting between the flared ends 16, 18 and the coupling unit 20 so as to approve the working environment. It has also been found that the coupling arrangement is of lighter weight then when coupling grooved ends, yet enables greater wall thickness of the axial sections 26, 28 of the flared ends 16, 18 than experienced with groove ends. Further, the particular design of the gasket 22 allows for higher working pressures in the conduit line.

Figure 9:
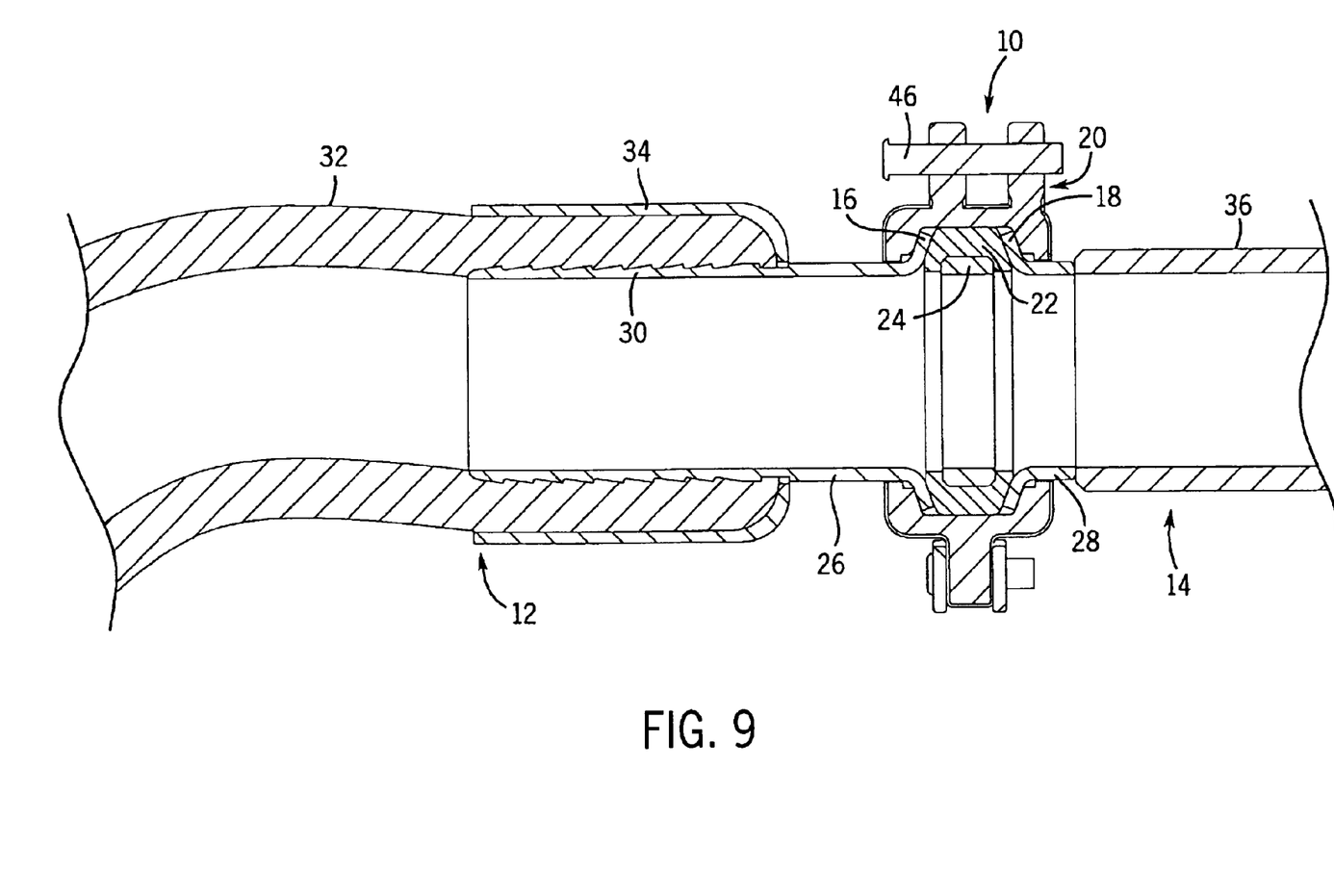
FIG. 9 is a view similar to FIG. 2 but showing an alternative flared end construction.

In the preferred embodiment, the inclined sidewalls 58 of the coupling sections 38, 40 have been advantageously formed at an angle a (FIG. 3) which is about 19 degrees. Also, it has been determined that the angular shoulders 64 of the gasket 20 are inclined at an angle of about 26 degrees as shown in FIG. 4. While the flared ends 16, 18 are shown preferably at 90 degree angles, it should be understood that the flared ends 16, 18 could also be angled obtusely over a range of 91 to 109 degrees, one such design being represented in FIG. 9.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

Various alternatives and embodiments are contemplated as being within the scope of the following claims particularly pointing out and distinctly claiming the subject matter regarded as the invention.

I claim:

1. A coupling arrangement for permitting fluid-tight, pressurized fluid flow therethrough comprising:
   a pair of conduit members located in end-to-end alignment, each of the conduit members having a flared end;
   an encircling coupling unit surrounding the ends of the conduit members and having structure to tighten the coupling unit around the flared ends of the conduit members, the coupling unit, having inner lateral surfaces partially defining a coupling cavity;
   an encircling, deformable gasket disposed in the cavity of the coupling unit, the gasket having exterior lateral surfaces spaced from the inner lateral surfaces of the coupling unit, and interior surfaces defining an annular recess therein; and
   a rigid ring liner retained within the annular recess of the deformable gasket to reinforce the gasket,
   wherein the flared ends of the conduit members are engaged in wedging and sealing relationship between the inner lateral surfaces of the coupling unit and the exterior lateral surfaces of the deformable gasket,
   wherein the coupling unit is formed by a pair of coupling sections pivotally connected together, and
   wherein each coupling section includes a set of axially extending outer faces connected to a set of radially extending stepped portions, in turn, connected to a set of axially extending stepped portions.

2. The coupling arrangement of claim 1, wherein at least one of the conduit members includes a hose.

3. The arrangement of claim 2, wherein at least one of the conduit members includes a pipe.

4. The coupling arrangement of claim 3, wherein the flared ends include axially extending sections to which the hose and the pipe are secured.

5. The coupling arrangement of claim 1, wherein the flared ends are bent at an angle of between 90 degrees and 109 degrees relative to a longitudinal axis of the coupling unit.

6. The coupling arrangement of claim 1, wherein each coupling section includes a base defining an inner diameter of the coupling section, the base having a pair of opposed ends.

7. The coupling arrangement of claim 6, wherein each coupling section includes a set of inclined sidewalls connecting respective ends of the base with the axially extending stepped portions.

8. The coupling arrangement of claim 7, wherein the inclined sidewalls diverge from the base to the axially extending stepped portions.

9. The coupling arrangement of claim 8, wherein the inclined sidewalls define the inner lateral surfaces of the coupling unit.

10. The coupling arrangement of claim 7, wherein the inclined sidewalls and the base define a generally frustroconically-shaped coupling cavity for receiving the flared ends of the conduit members and the gasket therein.

11. The coupling arrangement of claim 10, wherein the deformable gasket is a resilient, rubber-like ring member centrally positioned in the coupling cavity.

12. The coupling unit of claim 11, wherein the gasket includes an outer end wall defining an outer diameter of the gasket, the outer end wall being engageable with the base of each coupling section.

13. The coupling arrangement of claim 12, wherein the gasket further includes a set of vertical sidewalls connected to the outer end wall by a set of angular shoulders.

14. The coupling arrangement of claim 13, wherein the set of vertical sidewalls and the set of angular shoulders define the exterior lateral surfaces of the gasket.

15. The coupling arrangement of claim 14, wherein the gasket further includes a set of inner faces extending axially from the set of vertical sidewalls.

16. The coupling arrangement of claim 15, wherein the inner faces define an inner diameter of the gasket when the ring liner is retained in the annular recess.

17. The coupling arrangement of claim 13, wherein the angular shoulders and the vertical sidewalls are spaced inwardly from the inclined sidewalls of each coupling section.

18. The coupling arrangement of claim 13, wherein the angular shoulders of the gasket are oriented at an angle of about 26 degrees relative to the vertical sidewalls of the gasket.

19. A coupling arrangement for permitting fluid-tight, pressurized fluid flow therethrough comprising:

a pair of conduit members located in end-to-end alignment, each of the conduit members having a flared end;

an encircling coupling unit surrounding the ends of the conduit members and having structure to tighten the coupling unit around the flared ends of the conduit members, the coupling unit, having inner lateral surfaces partially defining a coupling cavity;

an encircling, deformable gasket disposed in the cavity of the coupling unit, the gasket having exterior lateral surfaces spaced from the inner lateral surfaces of the coupling unit, and interior surfaces defining an annular recess therein; and a rigid ring liner retained within the annular recess of the deformable gasket to reinforce the gasket, wherein the flared ends of the conduit members are engaged in wedging and sealing relationship between the inner lateral surfaces of the coupling unit and the exterior lateral surfaces of the deformable gasket, wherein the coupling unit is formed by a pair of coupling sections pivotally connected together, wherein each coupling section includes a set of axially extending outer faces connected to a set of radially extending stepped portions, in turn, connected to a set of axially extending stepped portions, wherein each coupling section includes a base defining an inner diameter of the coupling section, the base having a pair of opposed ends, wherein each coupling section includes a set of inclined sidewalls connecting respective ends of the base with the axially extending stepped portions, and wherein the inclined sidewalls of the coupling sections are formed at an angle of about 19 degrees relative to the radially extending stepped portions.

* * * * *